United States Patent
Nagai et al.

(10) Patent No.: US 7,328,094 B2
(45) Date of Patent: Feb. 5, 2008

(54) VEHICLE TAKE-OFF CONTROL APPARATUS AND METHOD

(75) Inventors: Tadayuki Nagai, Toyota (JP); Yoshio Hasegawa, Chiryuu (JP); Tooru Matsubara, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 546 days.

(21) Appl. No.: 10/880,706

(22) Filed: Jul. 1, 2004

(65) Prior Publication Data

US 2005/0021208 A1 Jan. 27, 2005

(30) Foreign Application Priority Data

Jul. 22, 2003 (JP) ............... 2003-199884

(51) Int. Cl.
*F16H 61/06* (2006.01)
*F16H 61/20* (2006.01)
*G06F 19/00* (2006.01)

(52) U.S. Cl. ......................... 701/51; 477/114
(58) Field of Classification Search ...................... None
See application file for complete search history.

(56) References Cited

U.S. PATENT DOCUMENTS

| | | | |
|---|---|---|---|
| 4,947,971 A | | 8/1990 | Tanaka |
| 5,704,873 A | * | 1/1998 | Iwata et al. .................. 477/115 |
| 5,916,058 A | | 6/1999 | Sakai et al. |
| 5,921,884 A | * | 7/1999 | Nishiwaki et al. ............. 477/61 |
| 6,023,648 A | * | 2/2000 | Murasugi et al. .............. 701/68 |
| 6,139,471 A | * | 10/2000 | Tsutsui et al. ............... 477/156 |
| 6,270,443 B1 | * | 8/2001 | Ito et al. ...................... 477/114 |
| 6,533,704 B2 | * | 3/2003 | Saito et al. .................... 477/92 |

FOREIGN PATENT DOCUMENTS

| | | |
|---|---|---|
| DE | 197 31 979 A1 | 1/1998 |
| DE | 695 22 529 T2 | 5/2002 |
| EP | 0 709 603 B1 | 5/1996 |
| JP | 5-65837 | 3/1993 |
| JP | 5-87235 | 4/1993 |
| JP | 10-153255 | 6/1998 |
| JP | 2000-304127 | 11/2000 |
| JP | 2000-304128 | 11/2000 |

\* cited by examiner

*Primary Examiner*—Michael J. Zanelli
(74) *Attorney, Agent, or Firm*—Oblon, Spivak, McClelland, Maier & Neustadt

(57) ABSTRACT

A take-off control apparatus and method is provided for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. The take-off control apparatus and method detects an engine speed and calculates an apply hydraulic pressure of the apply element during cancellation of the neutral control based on a fluctuation in the engine speed.

6 Claims, 9 Drawing Sheets

FIG. 2

|       | C1 | C2 | C3 | C4 | B1 | B2 | B3 | B4 | F0 | F1 | F2 | F3 |
|-------|----|----|----|----|----|----|----|----|----|----|----|----|
| P     |    |    |    |    |    |    |    |    |    |    |    |    |
| R     |    |    | O  | ◎  |    |    |    | O  |    | O  |    |    |
| N     |    |    |    |    |    |    |    |    |    |    |    |    |
| 1th   | O  |    |    | ◎  |    |    |    | ◎  | O  |    |    | O  |
| 2nd   | O  |    |    | ◎  |    | ◎  | O  |    | O  | O  | O  |    |
| 3rd   | O  |    | O  | ◎  | ◎  |    | △  |    | O  | O  |    |    |
| 4th   | O  | O  | △  | ◎  |    |    | △  |    | O  |    |    |    |
| 5th   | △  | O  | O  |    | O  |    | △  |    |    |    |    |    |
| 6th   | △  | O  |    |    | △  | O  | △  |    |    |    |    |    |

O ENGAGED

◎ ENGAGED WHEN ENGINE BRAKE IS APPLIED

△ ENGAGED BUT ENGAGEMENT IS NOT RELATED TO POWER TRANSMISSION

VEHICLE TAKE-OFF CONTROL APPARATUS AND METHOD

INCORPORATION BY REFERENCE

The disclosure of Japanese Patent Application No. 2003-199884 filed on Jul. 22, 2003, including the specification, drawings and abstract is incorporated herein by reference in its entirety.

BACKGROUND OF THE INVENTION

1. Field of the Invention

The invention generally relates to a take-off control apparatus and method for a vehicle equipped with an automatic transmission. More particularly, the invention relates to a take-off control apparatus and method for a vehicle, which executes a neutral control.

2. Description of the Related Art

An automatic transmission mounted in a vehicle is connected to an engine via a fluid coupling such as a torque converter provided in the automatic transmission, and includes a gear change mechanism that provides a plurality of power transmission paths. This automatic transmission is structured so as to automatically switch the power transmission path, i.e.,. the gear ratio (drive speed), based on the accelerator opening amount and the vehicle speed, for example. A vehicle having an automatic transmission is typically provided with a shift lever which is operated by a driver into any one of various shift positions (such as REVERSE, NEUTRAL, DRIVE). Automatic shift control is performed when the shift lever is in one of these shift positions (usually in the drive position or forward-drive range).

When a vehicle having this type of automatic transmission is stopped with the shift lever in a position corresponding to a forward-drive range, such as DRIVE, driving force from the idling engine is transmitted to the transmission via the torque converter and then to the wheels, resulting in a phenomenon known as "creeping." Creeping is extremely useful under certain conditions. For example, it facilitates smooth take-off of a vehicle when starting from a standstill on an incline. When the driver wants a vehicle that is stationary on a flat road to remain in one spot, however, creeping is unnecessary and must be suppressed by operating the brake. That is, the brake is used to suppress the creeping force from the engine and the fuel efficiency of the engine decreases by a corresponding amount.

To improve fuel efficiency, therefore, it has been proposed to put a transmission that is in the forward-drive range into a neutral state, including a semi-neutral state, that resembles NEUTRAL while still in the forward-drive range and the vehicle is being held stationary by the brake pedal being depressed so as to operate the brake and the accelerator being almost completely closed.

Many technologies for this kind of so-called neutral control and controlling a vehicle during the transition from a stationary state to a take-off state are known.

JP(A) 2000-304127 discloses a control apparatus for an automatic transmission, which is capable to preventing a variety of problems caused by delayed application of a forward clutch when the neutral control is cancelled. This kind of control apparatus includes i) slip state controlling means for controlling a specific friction apply element used to establish a predetermined speed into a predetermined slip state when a predetermined condition to start the control has been satisfied, ii) control canceling means for returning the friction apply element to the applied state by reducing the input rotational speed of the friction apply element in accordance with a predetermined rate of change when a predetermined condition to cancel the control has been satisfied based on the intention of a driver to take-off, and iii) rate of change correcting means for increasing the rate of change of the input rotational speed when at least one of a) an increase in engine torque and b) backing up of the vehicle has been detected during restoration of the friction apply element to the applied state by the control canceling means.

According to this control apparatus for an automatic transmission, the input rotational speed is quickly reduced in accordance with the increase-corrected rate of change when the engine torque suddenly increases due to, for example, a sudden operation of the accelerator. As a result, the friction apply element is returned to the applied state before the engine starts to race, thus enabling a smooth take-off to be achieved. Further, in a case in which a vehicle stopped on an incline starts to slide backward when the driver releases the brake pedal when starting to take off, the friction apply element applies quickly enough to prevent the vehicle from sliding backward unintentionally.

JP(A) 2000-304128 discloses a control apparatus for an automatic transmission, which is capable of preventing a control over-correction due to a fluctuation in line pressure when applying a forward clutch as neutral control is cancelled, and therefore capable of preventing shock from being generated by sudden application of the forward clutch. This control apparatus includes i) slip state controlling means for controlling a specific friction apply element used to establish a predetermined speed into a predetermined slip state when a predetermined condition to start the control has been satisfied, ii) apply controlling means for returning the friction apply element to the applied state when a predetermined condition to cancel the control has been satisfied based on the intention of a driver to take-off, iii) apply force increasing means for increasing the apply force on the friction apply element when an increase in engine torque has been detected while the friction apply element is being returned to the applied state by the apply controlling means, iv) line pressure detecting means for detecting an increase or decrease in line pressure in the automatic transmission, and v) over-correction preventing means for suppressing an increase in the apply force by the apply force increasing means in accordance with an increase in the line pressure of the automatic transmission.

Accordingly, this control apparatus for an automatic transmission suppresses an increase-correction in the apply force, which is executed in response to an increase in engine torque, from being executed in accordance with an increase in line pressure in the automatic transmission when the control keeping the friction apply element in a slip state is cancelled. As a result, over-correction of the apply force caused by a fluctuation in the line pressure can be prevented, and therefore shock can be prevented from being generated by sudden application of the friction apply element.

Despite these advantages, however, the control apparatuses in the foregoing publications have the following problems.

The control apparatus for an automatic transmission that is disclosed in JP(A) 2000-304127 is simply an apparatus which increases the target rate of change of the turbine speed in order to return the forward clutch to the applied state when an accelerator operation is performed when the neutral control is cancelled. The control apparatus for an automatic transmission that is disclosed in JP(A) 2000-304128 is simply an apparatus which i) increases a duty ratio of a solenoid to suppress the forward clutch from slipping when an accelerator operation is performed when the neutral control is cancelled, and ii) sets an engine speed correction amount in accordance with an increase in an ATF line pressure and decreases the duty ratio of the solenoid by that correction amount when an engine speed at that time is within a predetermined range.

In either case, good controllability is unable to be achieved in cases such as when the engine speed fluctuates and when a target speed ratio (the speed ratio is the rotational speed ratio of the torque converter; speed ratio=turbine speed/engine speed) deviates from a present speed ratio, both of which occur when the neutral control is cancelled.

More specifically, as the engine speed fluctuates, so does the torque transmitted to the drive train. An increase or decrease in the torque results in excessive or insufficient hydraulic pressure. Furthermore, despite the fact that control is performed to reduce the turbine speed during cancellation of the neutral control, as the engine speed increases (or decreases), force is also generated that tries to increase (or decrease) the turbine speed.

Also, the apply hydraulic pressure of the forward clutch changes when the present speed ratio deviates from the target speed ratio. A constant standby pressure during cancellation of the neutral control is calculated by adding a predetermined hydraulic pressure to a base pressure, which is an apply hydraulic pressure of a forward clutch just before the neutral control is cancelled. As a result, when the apply hydraulic pressure of the forward clutch fluctuates, the absolute value of the constant standby pressure changes, resulting in a constant standby pressure that is either excessive or insufficient.

If the hydraulic pressure (constant standby pressure) is too high when the neutral control is cancelled, the forward clutch applies suddenly which generates a shock. If the hydraulic pressure (constant standby pressure) is too low when the neutral control is cancelled, the forward clutch is unable to be applied sufficiently. As a result, the hydraulic pressure must be forcibly increased, which also generates a shock.

Moreover, when the engine speed fluctuates when the neutral control is cancelled or when the present speed ratio deviates from the target speed ratio when the neutral control is cancelled, the turbine speed behaves different than normally. If learning control is executed to learn the apply hydraulic pressure so that the amount of change in the turbine speed becomes equal to a desirable amount of change (i.e., equal a desirable ratio of change over time) in this case, the learning is erroneous.

SUMMARY OF THE INVENTION

In view of the foregoing problems, the invention thus provides a take-off control apparatus and method for a vehicle, which, when a neutral control is cancelled, is able to appropriately cancel the neutral control depending on the state of a fluid coupling or an engine.

One aspect of the invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method detects an engine speed, and calculates an apply hydraulic pressure of the apply element during cancellation of the neutral control based on a fluctuation in the engine speed.

This take-off control apparatus and method calculates a constant standby pressure, which is the apply hydraulic pressure of the apply element during cancellation of the neutral control, so that it increases (or decreases) during the neutral cancellation control when there is an increase (or decrease) in the engine speed after the start of the neutral cancellation control. A fluctuation in the engine speed when the neutral control is cancelled results in an increase or decrease in the torque that acts on the drive train, which in turn results in either excessive or insufficient hydraulic pressure. The constant standby pressure is therefore calculated taking this fluctuation in engine speed into account. Furthermore, control to reduce the turbine speed is performed during cancellation of the neutral control, but as the engine speed increases, force is also generated that tries to increase the turbine speed. In order to suppress this force and shift quickly from neutral control to normal control, the constant standby pressure is corrected so as to be increased. As a result, a vehicle take-off control apparatus and method can be provided which is able to appropriately cancel the neutral control depending on the state of the engine.

Another aspect of this invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method detects a speed ratio of a torque converter provided in the automatic transmission, and calculates an apply hydraulic pressure of the apply element during cancellation of the neutral control based on a fluctuation in the speed ratio.

This take-off control apparatus and method calculates a constant standby pressure, which is the apply pressure of the apply element during cancellation of the neutral control, by adding a predetermined hydraulic pressure amount to an apply hydraulic pressure (a base hydraulic pressure) corresponding to a speed ratio just before neutral cancellation control is performed. Therefore, if the speed ratio just before the start of the neutral cancellation control deviates from a target speed ratio, i.e., if the base hydraulic pressure just before the neutral cancellation control starts is fluctuating from the base hydraulic pressure for the target apply pressure, the constant standby pressure is calculated taking that fluctuation into account. For example, if the speed ratio is higher than the target speed ratio, the apply hydraulic pressure is too low and the apply element is slipping too much. If the speed ratio is less than the target speed ratio, the apply hydraulic pressure is too high and the apply element is being applied with too much force. The constant standby pressure can thus be calculated taking these into consideration. As a result, a take-off control apparatus and method can be provided which is able to appropriately cancel the neutral control depending on the state of the torque converter (i.e., the state of the speed ratio) when the neutral control is cancelled.

A further aspect of this invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method learns a hydraulic pressure command value of the apply element based on a turbine speed of a torque converter provided in the automatic transmission, detects an engine speed, and determines whether to execute the learning control based on the difference between the engine speed during the neutral cancellation control and the engine speed at the start of the neutral cancellation control.

If the difference between the engine speed during the neutral cancellation control and the engine speed at the start of the neutral cancellation control is large for some reason, then the turbine speed is not what it should be. In this case, the take-off control apparatus and method can prohibit the learning of the apply pressure of the apply element so the rate of change over time in the turbine speed becomes a desired rate of change.

Yet another aspect of this invention relates to a take-off control apparatus and method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied. This take-off control apparatus and method learns a hydraulic pressure command value of the apply element based on a turbine speed of a torque converter provided in the automatic transmission, detects the hydraulic pressure command value for the apply element just before the start of the neutral cancellation control, detects the hydraulic pressure command value for the apply element when the speed ratio of the torque converter becomes equal to a predetermined target speed ratio, and determines whether to execute the learning control based on the difference between the hydraulic pressure command value just before the start of the neutral cancellation control and the hydraulic pressure command value when the speed ratio of the torque converter reaches the predetermined target speed ratio.

If the difference between the speed ratio of the torque converter during the neutral cancellation control and the predetermined target speed ratio is large for some reason, the turbine speed is not what is should be. In this case, the foregoing take-off control apparatus and method can prohibit the learning of the apply pressure of the apply element such that the rate of change over time in the turbine speed becomes a desired rate of change.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIG. 2 is a clutch and brake application chart for the automatic transmission shown in FIG. 1;

DETAILED DESCRIPTION OF THE PREFERRED EMBODIMENTS

In the following description and the accompanying drawings, the present invention will be described in more detail with reference to exemplary embodiments.

A power train of a vehicle including a control apparatus according to exemplary embodiments of this invention is as follows. The control apparatus according to this exemplary embodiment is realized by an ECU (Electronic Control Unit) 1000 shown in FIG. 1. The automatic transmission described in this exemplary embodiment is an automatic transmission that is provided with a torque converter, which serves as a fluid coupling, and a planetary gear type gear change mechanism. It should be noted, however, that this invention is not limited to an automatic transmission having a planetary gear type gear change mechanism. That is, the automatic transmission may also be, for example, a continuously variable transmission such as a belt type continuously variable transmission.

Figure 1:
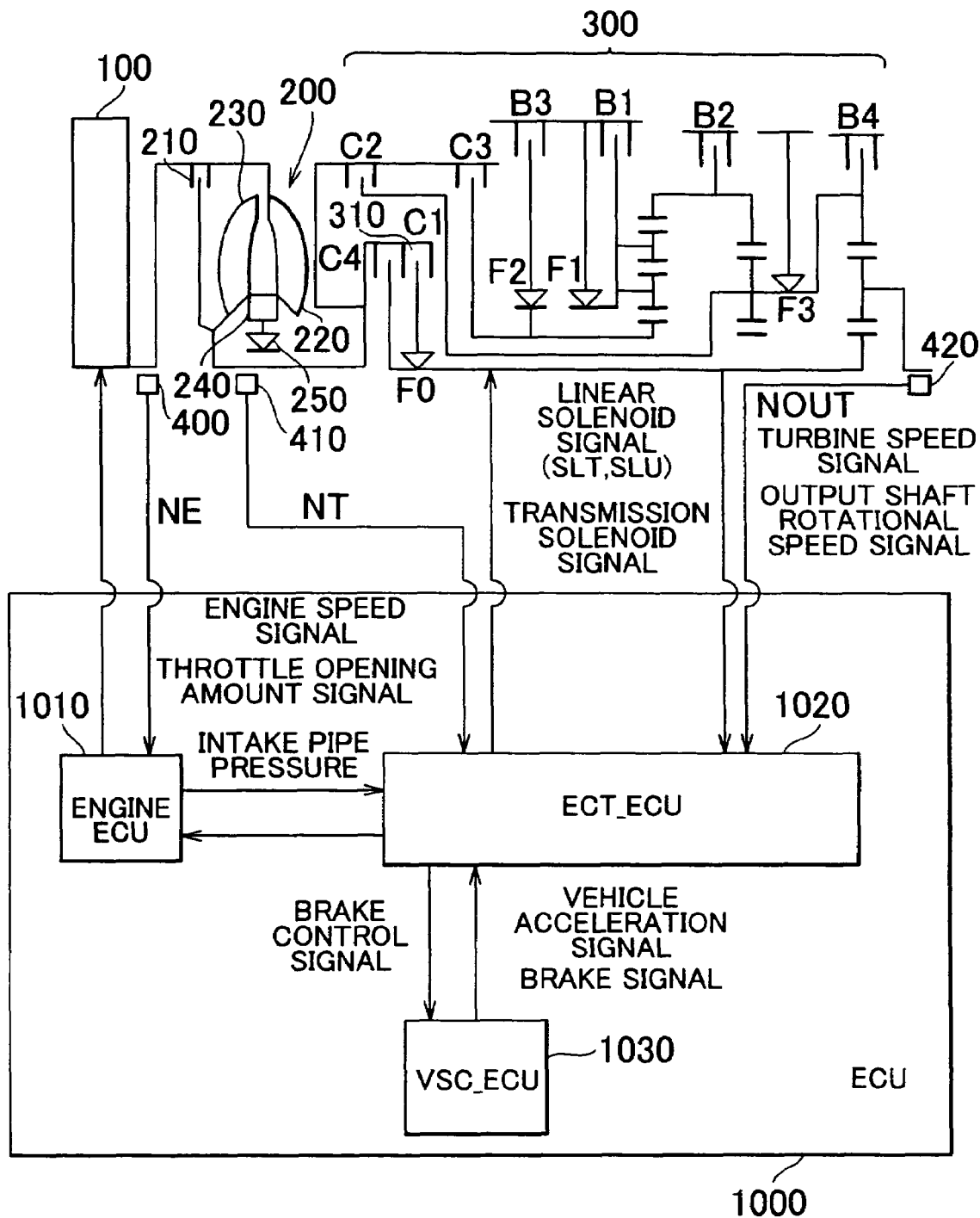
FIG. 1 is a control block diagram of an automatic transmission according to a first exemplary embodiment of the invention.

The power train of a vehicle including a control apparatus according to a first exemplary embodiment of this invention will be described with reference to FIG. 1. The control apparatus according to this exemplary embodiment is more specifically realized by an ECT (Electronically Controlled Automatic Transmission)_ECU 1020 shown in FIG. 1.

Referring to the drawing, the power train of the vehicle includes i) an engine 100, ii) an automatic transmission having a torque converter 200 and a planetary gear type gear change mechanism 300, and iii) the ECU 1000.

An output shaft of the engine 100 is connected to an input shaft of the torque converter 200. The engine 100 is coupled to the torque converter 200 via a rotating shaft. Therefore, an input shaft rotational speed (i.e., pump speed) of the torque converter 200 is the same as an output shaft rotational speed NE (i.e., engine speed NE) of the engine 100 detected by an engine speed sensor 400.

The torque converter 200 includes a lockup clutch 210 that locks the input shaft and the output shaft together, a pump impeller 220 on the input shaft side, a turbine runner 230 on the output shaft side, and a stator 240 used to increase torque, which has a one-way clutch 250. The torque converter 200 and the planetary gear type gear change mechanism 300 are connected via a rotating shaft. An output shaft rotational speed NT of the torque converter 200 (i.e., the turbine speed NT) is detected by a turbine speed sensor 410.

An output shaft rotational speed NOUT of the planetary gear type gear change mechanism 300 is detected by an output shaft rotational speed sensor 420.

FIG. 2 is a clutch and brake application chart for the planetary gear type gear change mechanism 300. More specifically, this chart shows which of the friction elements, i.e., clutch elements (C1 to C4 in the drawing), brake elements (B1 to B4), and one-way clutch elements (F0 to F3), are applied or released for each speed. In first speed, which is used when the vehicle starts from a standstill, the clutch element (C1) and the one-way clutch elements (F0 and F3) are applied. The clutch element C1, in particular, from among the clutch elements is referred to as an input clutch 310. This input clutch (C1) 310 is also referred to as a forward clutch, and is always applied when the transmission is in a speed to drive the vehicle forward when the shift lever is in a position other than the park (P) position, the reverse (R) position, or the neutral (N) position, as shown in the chart in FIG. 2.

When it has been determined that the shift lever is in the drive (D) position and the vehicle is stopped by predetermined conditions (e.g., the accelerator is off, the brake is on, the brake master cylinder pressure is equal to, or greater than, a predetermined value, and the vehicle speed is equal to, or less than, a predetermined value) being satisfied, so-called neutral control is performed in which the input clutch (C1) 310 is released and put into a predetermined slip state, thereby placing the transmission in a neutral-like state.

The ECU 1000 that controls the power train includes an engine ECU 1010 that controls the engine 100, the ECT (Electronically Controlled Automatic Transmission)_ECU 1020 that controls the planetary gear type gear change mechanism 300, and a VSC (Vehicle Stability Control)_ECU 1030.

The ECT_ECU 1020 receives a signal indicative of the turbine speed NT from the turbine speed sensor 410 and a signal indicative of the output shaft rotational speed NOUT from the output shaft rotational speed sensor 420. The ECT_ECU 1020 also receives a signal indicative of the engine speed NE detected by the engine speed sensor 400 and a signal indicative of a throttle opening amount detected by a throttle position sensor, both of which are output by the engine ECU 1010.

These rotational speed sensors are disposed facing teeth of rotation detecting gears mounted on the input shaft of the torque converter 200, the output shaft of the torque converter 200, and the output shaft of the planetary gear type gear change mechanism 300. These rotational speed sensors are capable of detecting even slight rotation of the input shaft of the torque converter 200, the output shaft of the torque converter 200, and the output shaft of the planetary gear type gear change mechanism 300. These sensors may be sensors which use, for example, magnetic resistance elements, generally referred to as semiconductor sensors.

Further, a signal indicative of the vehicle acceleration detected by a G sensor, as well as a signal indicating whether the brake is on, is output from the VSC_ECU 1030 to the ECT_ECU 1020. The VSC_ECU 1030 inputs a brake control signal from the ECT_ECU 1020 and controls the brakes of the vehicle by controlling the brake hydraulic pressure circuit.

Figure 3:
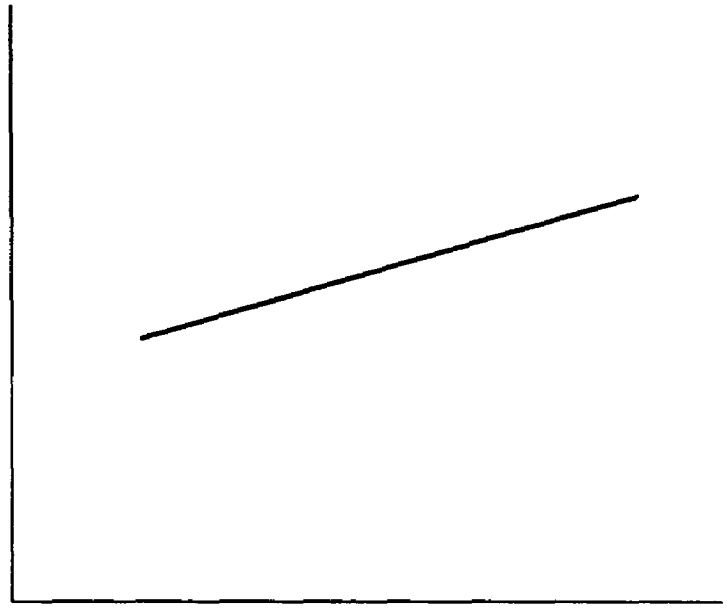
FIG. 3 is a view (part 1) of a map stored in memory of an ECU shown in FIG. 1.

A map stored in the memory of the ECT_ECU 1020, which relates to the control apparatus according to this exemplary embodiment, will be described with reference to FIG. 3. The map in FIG. 3 shows the relationship between the engine speed at the start of control to cancel the neutral control (hereinafter referred to as "neutral cancellation control") and a base constant standby pressure (a). The base constant standby pressure (a) is set so as to increase as the engine speed at the start of the neutral cancellation control increases.

Figure 4:
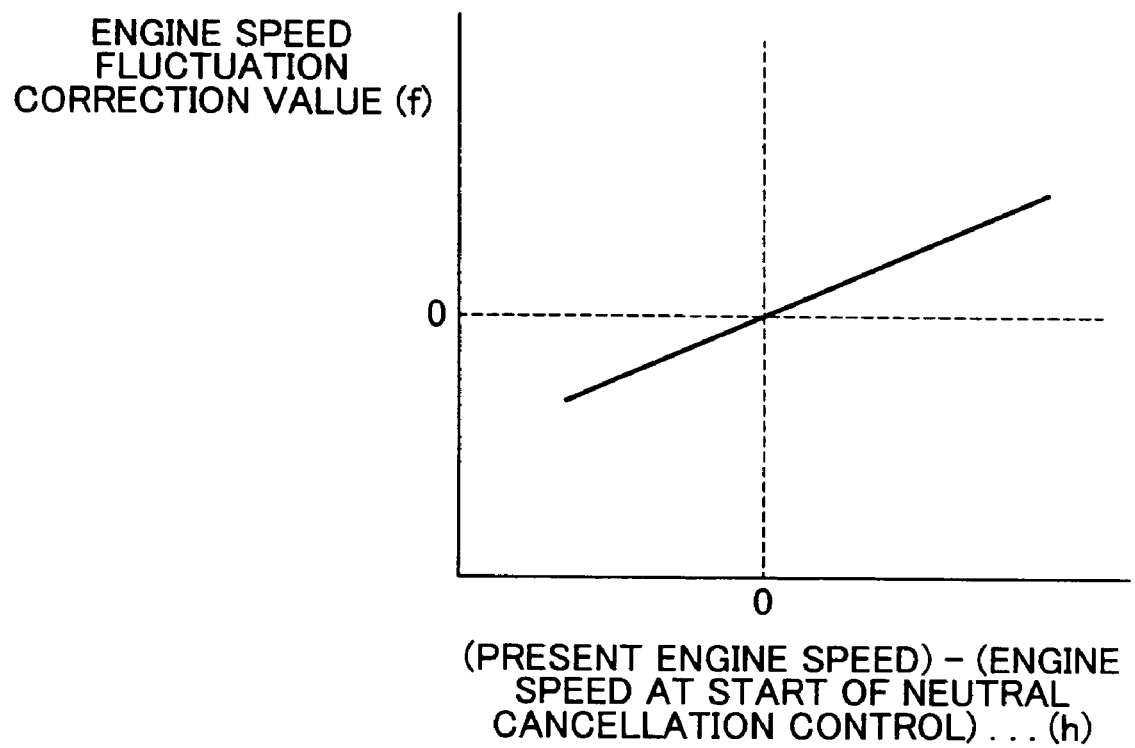
FIG. 4 is a view (part 2) of a map stored in the memory of the ECU shown in FIG. 1.

Another map similar to that in FIG. 3, which is also stored in the memory of the ECT_ECU 1020 will be described with reference to FIG. 4. FIG. 4 is a map showing the relationship between 1) a difference (h) of the present engine speed during cancellation of the neutral control minus the engine speed at the start of cancellation of the neutral control, and 2) an engine speed fluctuation correction value (f). This engine speed fluctuation correction value (f) is set to increase the larger the difference of the present engine speed during cancellation of the neutral control minus the engine speed at the start of cancellation of the neutral control.

Figure 5:
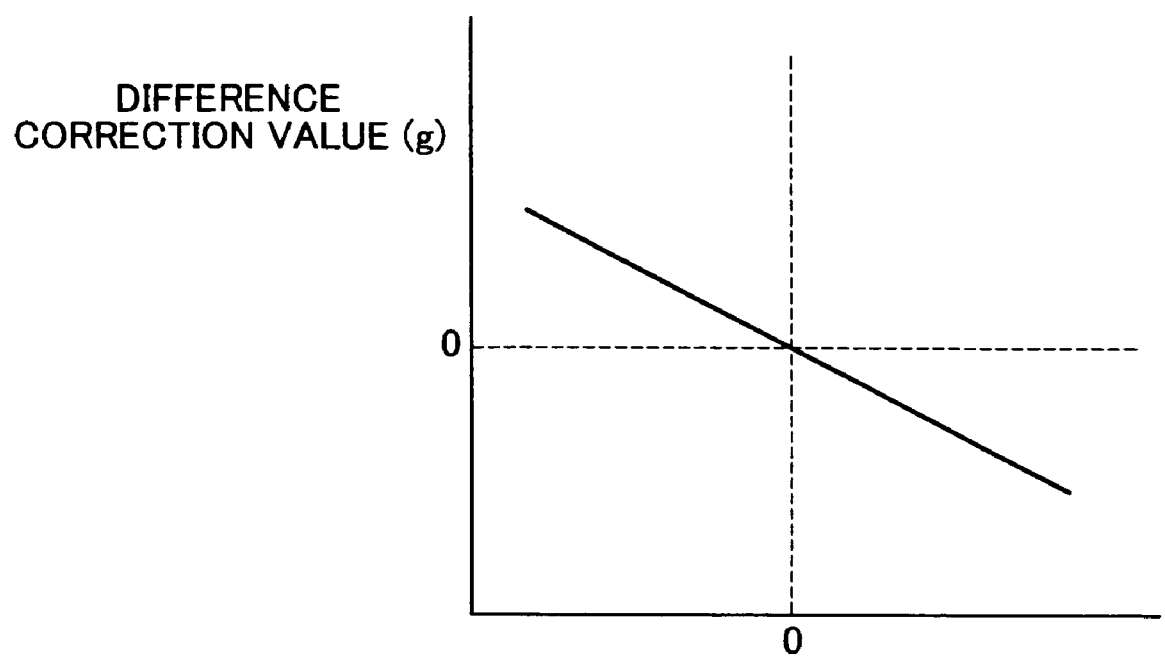
FIG. 5 is a view (part 3) of a map stored in the memory of the ECU shown in FIG. 1.

Yet another map similar to those in FIGS. 3 and 4, which is also stored in the memory of the ECT_ECU 1020 will be described with reference to FIG. 5. The map in FIG. 5 shows the relationship between 1) a difference (i) of a hydraulic pressure (i.e., a hydraulic pressure command value) just before the neutral cancellation control minus a hydraulic pressure learning value (i.e., hydraulic pressure command value) at the target speed ratio, and 2) a difference correction value (g) for correcting a difference between the hydraulic pressure at the actual speed ratio and the hydraulic pressure at the target speed ratio. As shown in the drawing, the difference correction value (g) is set to become smaller the larger the difference (i) of the hydraulic pressure command value just before cancellation of the neutral control minus the hydraulic pressure learning value at the target speed ratio.

The maps shown in FIGS. 3 to 5 are merely examples; the invention is by no means limited to these.

The control structure of a program executed by the ECT_ECU 1020, which relates to the control apparatus according to this exemplary embodiment, will be described with reference to FIGS. 6 and 7.

In step S100, the ECT_ECU 1020 determines whether to cancel the neutral control. If it is determined that the neutral control is to be cancelled (i.e., YES in step S100), the routine proceeds on to step S102. If not (i.e., NO in step S100), step S100 is executed again.

In step S102, the ECT_ECU 1020 reads the engine speed at the start of cancellation of the neutral control. This is done based on an engine speed signal input to the ECT_ECU1020 from the engine ECU 1010.

In step S104, the ECT_ECU 1020 calculates an initial control pressure. In step S106, the ECT_ECU 1020 determines whether to end an initial control phase. This determination is made based on a timer, for example. If the initial control phase has ended (i.e., YES in step S106), the routine proceeds on to step S108. If not, (i.e., NO in step S106), step S106 is executed again.

In step S 108, the ECT_ECU 1020 calculates the constant standby pressure base value (a), which serves as the base constant standby pressure. The constant standby pressure base value (a) is calculated at this time based on the engine speed at the start of the neutral cancellation control using the map shown in FIG. 3. In step S100, the ECT_ECU 1020 calculates an oil temperature correction value (b). In step S112, the ECT_ECU 1020 reads a learning value (c).

In step S114, the ECT_ECU 1020 calculates an accelerator on correction value (d) in response to the accelerator being depressed. In step S116, the ECT_ECU 1020 calculates a gradient correction value (e) from the gradient. The routine then proceeds on to step S118 in FIG. 7.

In step S118, the ECT_ECU 1020 reads the present engine speed. This is done based on the engine speed signal input from the engine ECU 1010 to the ECT_ECU 1020, just as it is in step S102.

In step S120, the ECT_ECU 1020 calculates a difference (h) between the present engine speed and the engine speed at the start of the neutral cancellation control. In step S122, the ECT_ECU 1020 calculates an engine speed fluctuation correction value (f) from the difference (h) based on the map shown in FIG. 4.

In step S124, the ECT_ECU 1020 reads a hydraulic pressure learning value when the speed ratio reaches the target speed ratio. In step S126, the ECT_ECU 1020 reads the hydraulic pressure right before the neutral cancellation control starts. The hydraulic pressure learning value in step S124 and the hydraulic pressure value in step S126 are the hydraulic pressure command values for the input clutch C1.

In step S128, the ECT_ECU 1020 calculates the difference (i) between the hydraulic pressure learning value read in step S124 and the hydraulic pressure value read in step S126. In step S130, the ECT_ECU 1020 calculates the difference correction value (g) for correcting a difference between the hydraulic pressure at the actual speed ratio and the hydraulic pressure at the target speed ratio. In this step, the difference correction value (g) is calculated from the difference (i) using the map shown in FIG. 5.

In step S132, the ECT_ECU 1020 calculates the constant standby pressure. This constant standby pressure is calculated at this time as the sum of the constant standby pressure base value (a)+the oil temperature correction value (b)+the learning value (c)+the accelerator on correction value (d)+ the gradient correction value (e)+the engine speed fluctuation correction value (f)+the difference correction value (g) for correcting a difference between the hydraulic pressure at the actual speed ratio and the hydraulic pressure at the target speed ratio. There may be a negative value(s) among these values (a) through (g).

Figure 6:
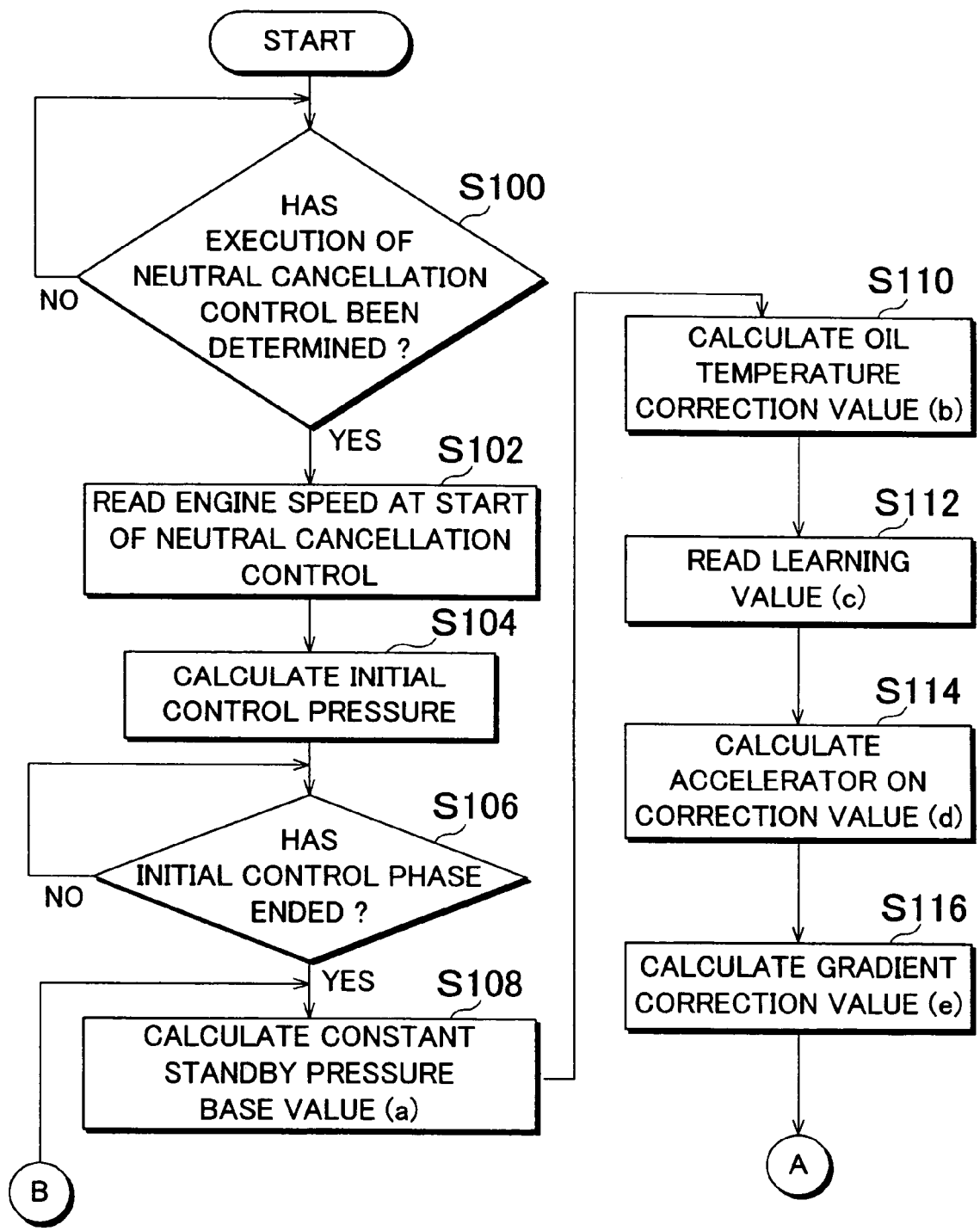
FIG. 6 is a flowchart (part 1) showing the control structure of a program executed by the ECU according to the first exemplary embodiment of the invention.
Figure 7:
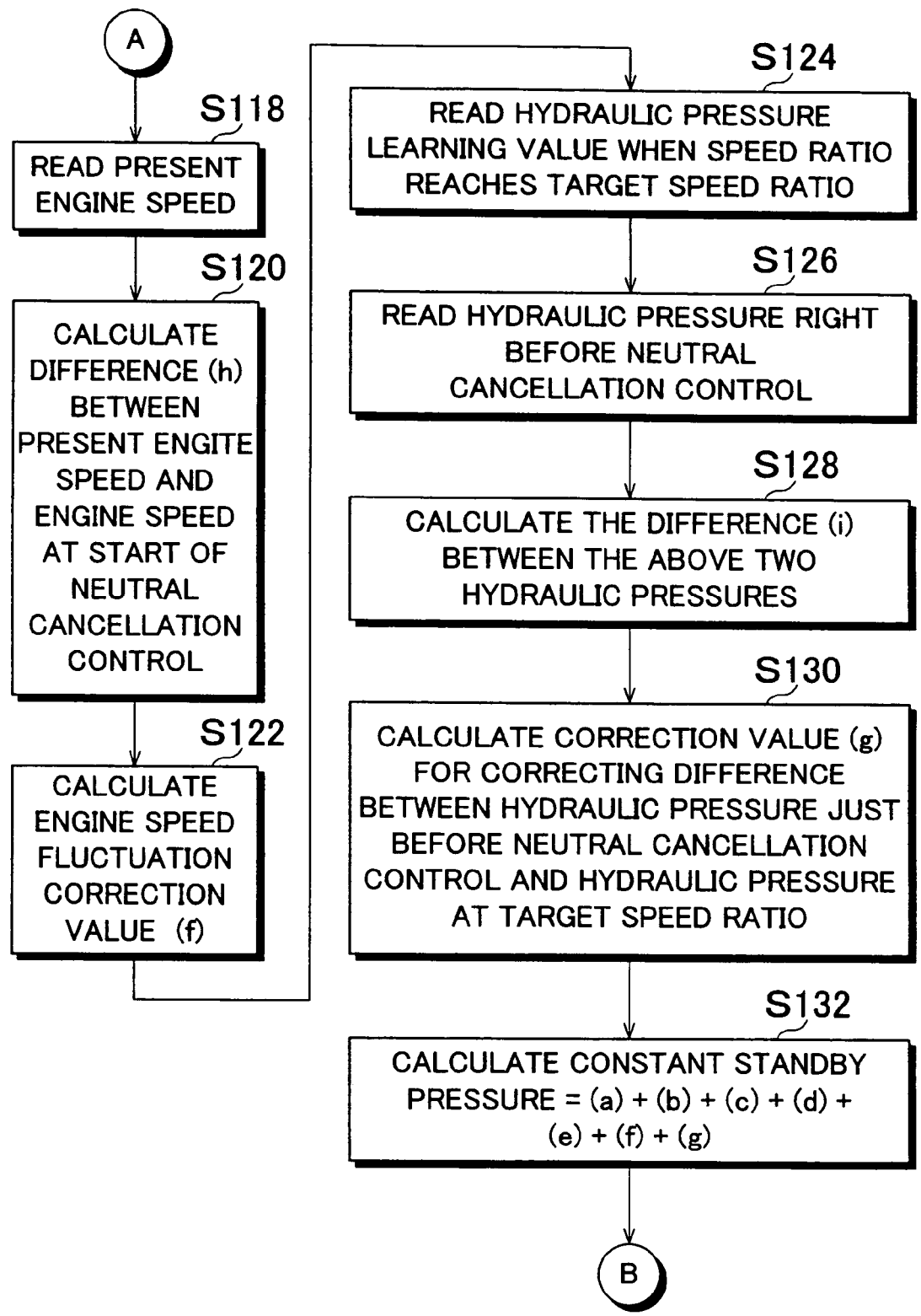
FIG. 7 is a flowchart (part 2) showing the control structure of the program executed by the ECU according to the first exemplary embodiment of the invention.

After step S132, the routine returns to step S108 in FIG. 6. The neutral control cancellation operation in the vehicle equipped with the ECT_ECU 1020, which relates to the control apparatus according to this exemplary embodiment, will now be described based on the foregoing structure and flowcharts.

Figure 8:
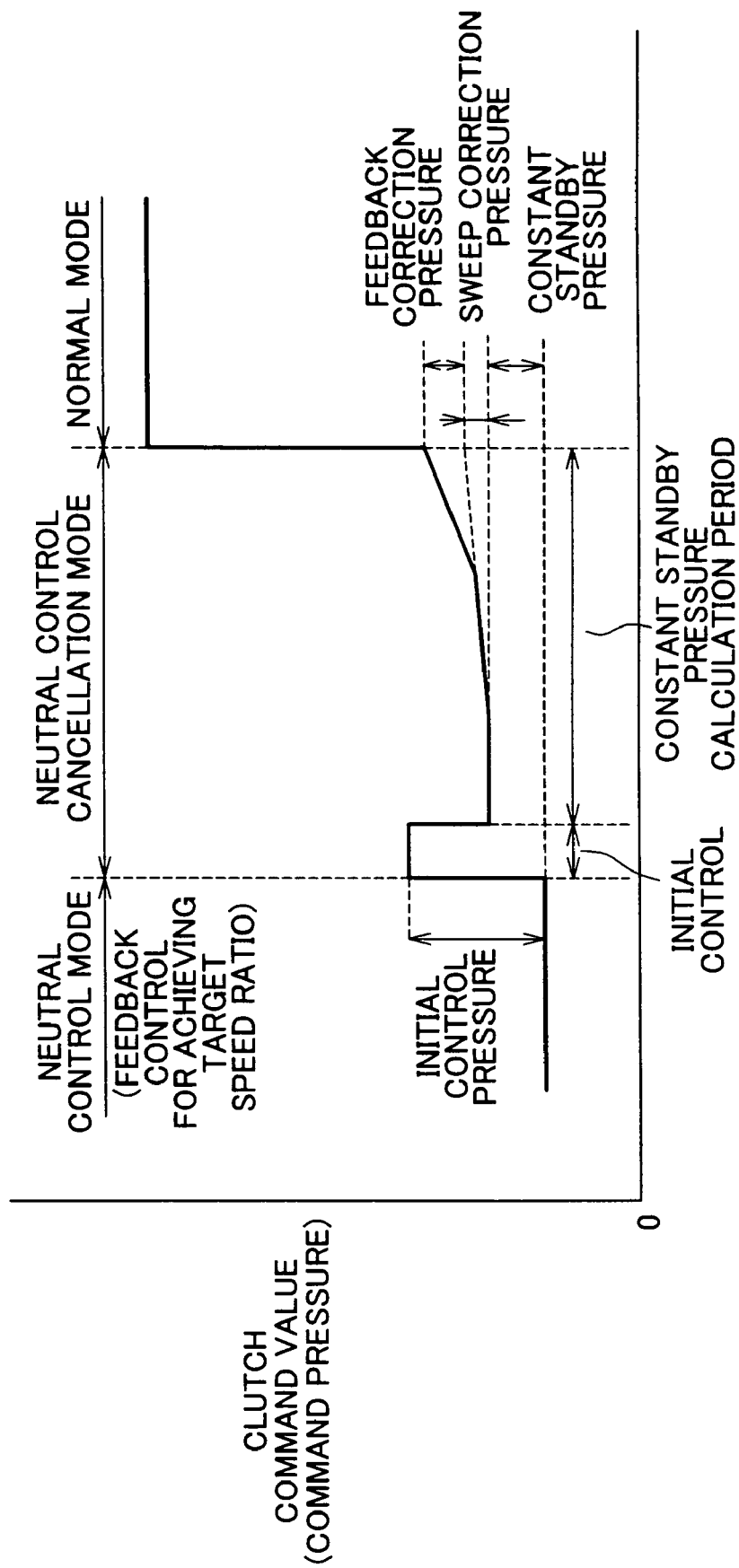
FIG. 8 is a timing chart showing the operation of a vehicle equipped with an automatic transmission according to the first exemplary embodiment of the invention.

FIG. 8 shows the change over time in the clutch command value (command pressure) of the input clutch (C1) 310 during cancellation of the neutral control. In the neutral control mode, the apply pressure of the input clutch (C1) 310 is feedback controlled so that the speed ratio becomes equal to the target speed ratio. When there is a shift from the neutral control mode to the normal mode through the neutral control cancellation mode, the apply pressure of the input clutch (C1) 310, which is feedback controlled so that the speed ratio becomes equal to the target speed ratio, is first abruptly increased to the initial control pressure. When this initial control is over, the constant standby pressure calculation period begins. The constant standby pressure is calculated at this time based on the flowcharts illustrated in FIGS. 6 and 7.

As shown in FIG. 6, during this constant standby pressure calculation period, the constant standby pressure base value (a) is calculated (step S108), the oil temperature correction value (b) is calculated (step S110), and the learning value (c) is read (step S112). Further, the accelerator on correction value (d) and the gradient correction value (e) are calculated (steps S114 and S116, respectively). During the constant standby pressure calculation period, the present engine speed is read (step S118) and the difference (h) between the present engine speed and the engine speed at the start of the neutral cancellation control is calculated (step S120). The engine speed fluctuation correction value (f) is calculated from the map shown in FIG. 4 based on the difference (h) (step S122).

The hydraulic pressure learning value when the speed ratio reaches the target speed ratio is read (step S124), as is the hydraulic pressure value right before the neutral cancellation control (step S126), and the difference (i) between the two values is calculated (step S128). The difference correction value (g) for correcting a difference between the hydraulic pressure at the actual speed ratio and the hydraulic pressure at the target speed ratio is calculated based on this difference (i) and the map shown in FIG. 5 (step S130).

The constant standby pressure is calculated as the sum of the constant standby pressure base value (a)+the oil temperature correction value (b)+the learning value (c)+the accelerator on correction value (d)+the gradient correction value (e)+the engine speed fluctuation correction value (f)+the difference correction value (g) for correcting a difference between the hydraulic pressure at the actual speed ratio and the hydraulic pressure at the target speed ratio (step S132). The apply hydraulic pressure of the input clutch (C1) 310 during the neutral control cancellation mode is controlled using the constant standby pressure shown in FIG. 8.

In the cycle of the neutral control cancellation mode, the apply pressure of the input clutch (C1) 310 is calculated by adding a sweep correction pressure and a feedback correction pressure to the apply pressure. When the neutral control cancellation mode ends, the normal mode begins, at which time the input clutch (C1) 310 is completely applied.

In this manner, the ECT_ECU 1020, which relates to the control apparatus according to this exemplary embodiment, repeatedly calculates the engine speed fluctuation correction value (f) based on the difference (h) between the present engine speed and the engine speed at the start of the neutral cancellation control during the constant standby pressure calculation period in the neutral cancellation control. Also, during the constant standby pressure calculation period, the difference correction value (g) for correcting a difference between the hydraulic pressure at the actual speed ratio and the hydraulic pressure at the target speed ratio is calculated based on the difference (i) between the hydraulic pressure learning value when the speed ratio reaches the target speed ratio and the hydraulic pressure value right before the neutral control is cancelled. The constant standby pressure is repeatedly calculated based on the engine speed fluctuation correction value (f) and the difference correction value (g) for correcting a difference between the hydraulic pressure at the actual speed ratio and the hydraulic pressure at the target speed ratio. As a result, when the neutral control is to be cancelled, it can be cancelled appropriately according to the engine speed and the speed ratio of the torque converter, so that shock due to application of the input clutch can be avoided.

A control apparatus according to a second exemplary embodiment of the invention will now be described. The control block diagram of the vehicle which includes the control apparatus according to this exemplary embodiment is the same as that according to the first exemplary embodiment. Therefore, a detailed description thereof (i.e., FIGS. 1 and 2) will not be repeated.

Figure 9:
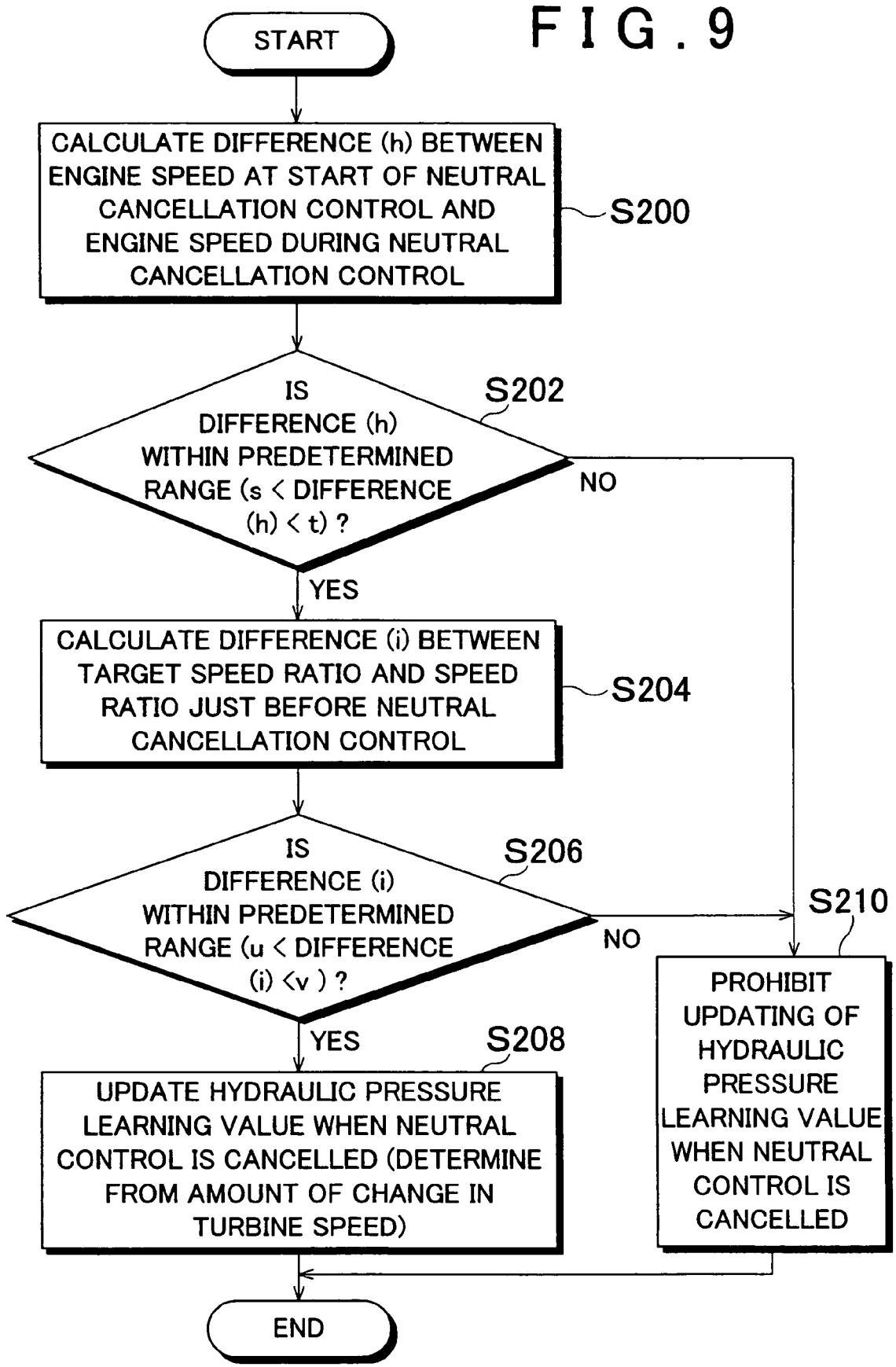
FIG. 9 is a flowchart showing the control structure of a program executed by an ECU according to a second exemplary embodiment of the invention.

The control structure of a program executed by the ECT_ECU 1020, which relates to the control apparatus according to the second exemplary embodiment, will be described with reference to FIG. 9. The flowchart in FIG. 9 is a flowchart used to determine whether to execute the hydraulic pressure learning control when canceling the neutral control.

In step S200, the ECT_ECU 1020 calculates the difference (h) between the engine speed at start of the neutral cancellation control and the engine speed during cancellation of the neutral control. In step S202, the ECT_ECU 1020 determines whether the difference (h) is within a predetermined range. For example, using a constant s and a constant t, which is larger than the constant s, which are set in advance, it is determined at this time whether s<difference (h)<t is satisfied. If the difference (h) is within the predetermined range (i.e., YES in step S202), the routine proceeds on to step S204. If not (i.e., NO in step S202), the routine proceeds on to step S210.

In step S204, the ECT_ECU 1020 calculates the difference (i) between the target speed ratio and the speed ratio just before cancellation of the neutral control. In step S206, the ECT_ECU 1020 determines whether the difference (i) is within a predetermined range. For example, using a constant u and a constant v, which is larger than the constant u, which are set in advance, it is determined whether u<difference (i)<v is satisfied. If the difference (i) is within the predetermined range (i.e., YES in step S206), the routine proceeds on to step S208. If not (i.e., NO in step S206), the routine proceeds on to step S210.

In step S208, the ECT_ECU 1020 updates the hydraulic pressure learning value during cancellation of the neutral control. The updating of the hydraulic pressure learning value is determined by the amount of change over time (rate of change over time) in the turbine speed NT and a hydraulic pressure value is learned so that the rate of change over time becomes a predetermined rate of change over time.

In step S210, the ECT_ECU 1020 prohibits the updating of the hydraulic pressure learning value during cancellation of the neutral control.

The neutral control cancellation operation in the vehicle equipped with the ECT_ECU 1020, which relates to the control apparatus according to this exemplary embodiment, will now be described based on the foregoing structure and flowcharts.

The neutral cancellation control is executed when a condition for canceling the neutral control is satisfied while the neutral control is being executed. At this time, when the difference (h) between the engine speed at the start of the neutral cancellation control and the engine speed during cancellation of the neutral control is calculated (step S200) and this difference (h) falls within the predetermined range (i.e., YES in step S202), and the difference (i) between the target speed ratio and the speed ratio just before the neutral cancellation control is started is calculated (step S204) and this difference (i) falls within a predetermined range (i.e., YES in step S206), the hydraulic pressure learning value during cancellation of the neutral control is updated (step S208).

If, on the other hand, the difference (h) is not within the predetermined range (i.e., NO in step S202) or the difference (i) is not within the predetermined range (i.e., NO in step S206), it means that the engine speed or the speed ratio is fluctuating so the turbine speed is most likely not changing appropriately. As a result, the hydraulic pressure learning value during cancellation of the neutral control is prohibited (step S210).

As described above, when the neutral control is cancelled, the ECT_ECU, which relates to the control apparatus according to this exemplary embodiment, executes the hydraulic pressure learning control during cancellation of the neutral control based on the amount of change in the turbine speed. If the difference between the engine speed during cancellation of the neutral control and the engine speed at the start of the neutral cancellation control or the difference between the target speed ratio and the speed ratio just before cancellation of the neutral control is large, however, it is determined that the turbine speed is not what it should be, so the hydraulic pressure learning value during cancellation of the neutral control is prohibited from being changed. As a result, it is possible to properly execute the learning control when canceling the neutral control.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A take-off control apparatus for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control apparatus comprising:

a controller that detects an engine speed and calculates an apply hydraulic pressure of the apply element during cancellation of the neutral control based on a fluctuation in the engine speed.

2. The take-off control apparatus according to claim 1, wherein the controller calculates a constant standby pressure during cancellation of the neutral control based on a difference between the engine speed during the neutral cancellation control and the engine speed at the start of the neutral cancellation control.

3. The take-off control apparatus according to claim 2, wherein the controller increases the constant standby pressure the larger the difference of the engine speed during the neutral cancellation control minus the engine speed at the start of the neutral cancellation control.

4. A take-off control method for a vehicle equipped with an automatic transmission having an apply element that is applied when the vehicle takes off from a standstill, which executes a neutral control that releases the apply element when the automatic transmission is in a forward-drive range and the vehicle is stopped with a predetermined condition being satisfied, and executes a neutral cancellation control that cancels the neutral control when a different predetermined condition is satisfied, the take-off control method comprising the steps of:

detecting an engine speed; and calculating an apply hydraulic pressure of the apply element during cancellation of the neutral control based on a fluctuation in the engine speed.

5. The take-off control method according to claim 4, further comprising the step of:

calculating a constant standby pressure during cancellation of the neutral control based on a difference between the engine speed during the neutral cancellation control and the engine speed at the start of the neutral cancellation control.

6. The take-off control method according to claim 5, further comprising the step of:

increasing the constant standby pressure the larger the difference of the engine speed during the neutral cancellation control minus the engine speed at the start of the neutral cancellation control.

* * * * *